No. 606,943. Patented July 5, 1898.
F. & M. SCHNEIDERLÖCHNER.
VELOCIPEDE.
(Application filed Mar. 11, 1897.)

(No Model.)

WITNESSES:
J. P. Appleman
W. H. Timmermann

INVENTORS
F. Schneiderlöchner
M. Schneiderlöchner
BY Henry C. Evert
ATTORNEY.

THE NORRIS PETERS CO., PHOTO-LITHO., WASHINGTON, D. C.

UNITED STATES PATENT OFFICE.

FRANK SCHNEIDERLÖCHNER AND MARTIN SCHNEIDERLÖCHNER, OF PITTSBURG, PENNSYLVANIA.

VELOCIPEDE.

SPECIFICATION forming part of Letters Patent No. 606,943, dated July 5, 1898.

Application filed March 11, 1897. Serial No. 627,011. (No model.)

*To all whom it may concern:*

Be it known that we, FRANK SCHNEIDERLÖCHNER and MARTIN SCHNEIDERLÖCHNER, citizens of the United States of America, residing at Pittsburg, in the county of Allegheny and State of Pennsylvania, have invented certain new and useful Improvements in Vehicles, of which the following is a specification, reference being had therein to the accompanying drawings.

This invention relates to certain new and useful improvements in vehicles, and has for its object to construct a device which will be light, strong, and easily operated.

Our improvement relates more particularly to that class of inventions designed to be operated by foot-power, and aims to provide a vehicle which can be easily operated and managed, cheap, light of construction, and strong, and so arranged as to attain a greater velocity than has heretofore been attained.

With the above and other objects in view the invention finally consists in the novel construction, combination, and arrangement of parts to be hereinafter more specifically described, and particularly pointed out in the claim.

In describing the invention in detail reference is had to the accompanying drawings, forming a part of this specification, and wherein like figures of reference indicate similar parts throughout the several views, in which—

Figure 1:
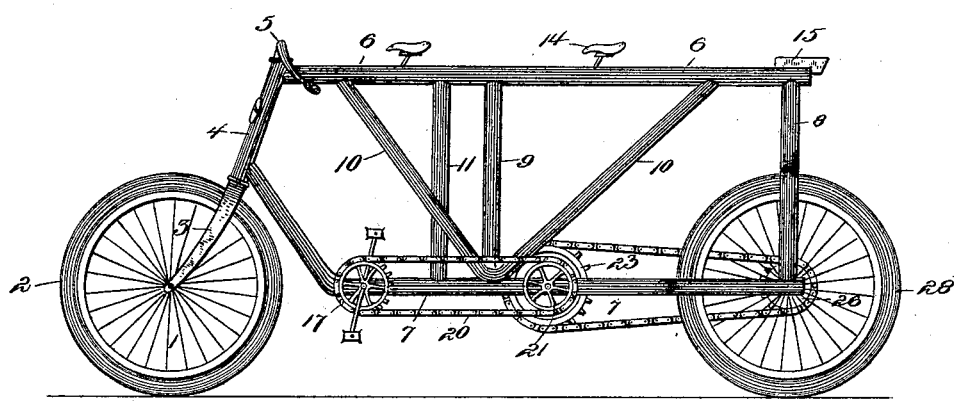
Figure 2:
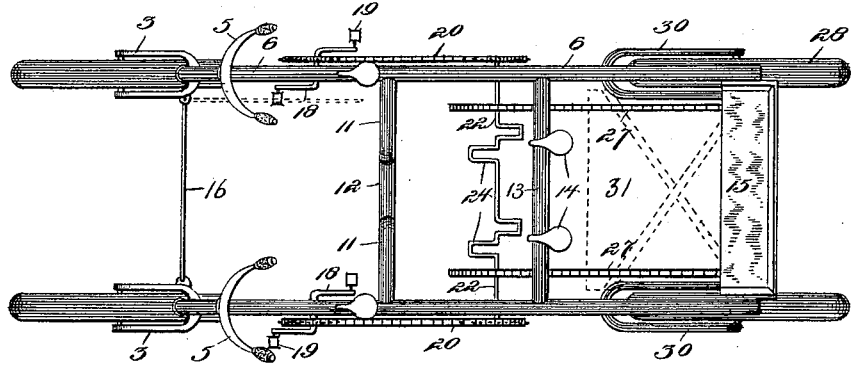
Figure 3:
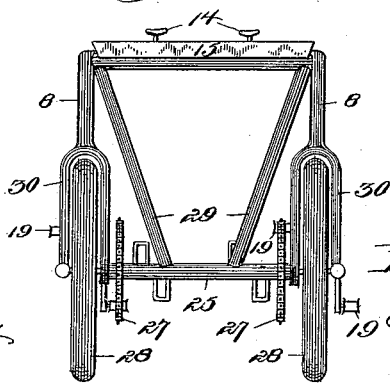

Figure 1 is a side elevation. Fig. 2 is a top plan view, and Fig. 3 is an end elevation.

Referring to the drawings, 1 designates the ordinary type of bicycle-wheel which is provided with an inflated rubber tire 2. Said wheels are mounted in forks 3, which are pivotally secured in the steering-heads 4 and carrying on their upper ends handle-bars 5. Secured to the steering-heads are parallel horizontal bars 6 and 7. The opposite ends engage forks 8 8, in which are mounted the rear wheels. Said horizontal bars are secured together by vertical braces 9 9. Secured to the horizontal bars 6 and 7 are angle-braces 10, and secured to the bar 6 and engaging a horizontal brace 12 are braces 11.

Secured to the parallel bars 6 and extending at right angles thereto is a brace 13, carrying seats or saddles 14, and secured to the rear end of horizontal bars 6 is a seat 15. Pivotally secured to the forks engaging the front wheels is a bar 16, whereby the vehicle can be guided by one of the handle-bars alone.

Mounted in the horizontal bars 7 and near the front end thereof are sprocket-wheels 17, and being provided with crank-arms 18 and pedals 19. Mounted in the bars 7, at substantially midway their length, are sprocket-wheels 21, which are secured to the ends of the shaft 22. Engaging the sprocket-wheels 17 and 21 is an endless chain 20, which transmits motion from the wheel 17 to the wheel 21. Mounted on the shaft 22 and between the bars 7 are sprocket-wheels 23, said shaft 22 being provided with cranks 24 between the sprocket-wheels 23. Secured to the rear axle 25 are sprocket-wheels 26, and engaging said sprocket-wheels 26 and 23 is an endless chain 27, which transmits motion to the rear wheels 28. Engaging the rear axle 25 and horizontal bars 7 are angle-braces 29, said braces serving to strengthen and stiffen the frame. Mounted upon a frame formed of braces secured to the bars 6 is a platform 31, serving as a foot-rest for passengers occupying seat 15.

Force being applied to the pedals 19, the sprocket-wheels 17 are operated, transmitting motion, through the sprocket-wheels 17, 21, and 23 and endless chains 20 and 27, to the rear wheels 28, thereby giving the vehicle a forward motion.

It will be noted that various changes may be made in the details of construction without departing from the general spirit of our invention.

Having fully described our invention, what we claim as new, and desire to secure by Letters Patent, is—

In a vehicle, longitudinal parallel bars 6 and 7, braces connecting said bars, a horizontal support carrying seats or saddles, a seat secured to the end of the longitudinal bars 6, cranks journaled in the longitudinal bars 7 and carrying sprocket-wheels 17, a crank-shaft 22 journaled in said bars 7 and substantially midway their length, sprocket-wheels 21 secured to the end of said crank-shaft, sprocket-chains connecting wheels 17 and 21, sprocket-wheels mounted on said crank-shaft intermediate the longitudinal bars 7, a sprocket-wheel 26 mounted on the rear axle, sprocket-chains connecting sprocket-wheels 23 and 26, a pivoted bar connecting the steering-forks, and means for operating the steering-forks, substantially as herein shown and described.

In testimony whereof we affix our signatures in presence of two witnesses.

FRANK SCHNEIDERLÖCHNER.
MARTIN SCHNEIDERLÖCHNER.

Witnesses:
JNO. P. APPLEMAN,
GEO. B. PARKER.